United States Patent [19]
Kim

[11] Patent Number: 5,303,059
[45] Date of Patent: Apr. 12, 1994

[54] MOTION ADAPTIVE FREQUENCY FOLDING METHOD AND CIRCUIT

[75] Inventor: Young-Je Kim, Suwon, Rep. of Korea

[73] Assignee: SamSung Electronics Co. Ltd., Suwon, Rep. of Korea

[21] Appl. No.: 903,348

[22] Filed: Jun. 24, 1992

[30] Foreign Application Priority Data

Jun. 27, 1991 [KR] Rep. of Korea ............... 91-10836

[51] Int. Cl.$^5$ .................. H04N 9/77; H04N 7/18
[52] U.S. Cl. ...................... 358/310; 358/335; 348/431
[58] Field of Search ......... 358/310, 105, 323, 335; H04N 9/79, 7/18

[56] References Cited

U.S. PATENT DOCUMENTS

| | | | |
|---|---|---|---|
| 4,831,463 | 5/1989 | Faroudja | 358/310 |
| 5,036,386 | 7/1991 | Yasumoto et al. | 358/141 |
| 5,083,203 | 1/1992 | Ko et al. | 358/105 |
| 5,113,262 | 5/1992 | Strolle et al. | 358/310 |

Primary Examiner—James J. Groody
Assistant Examiner—Safet Metjahic
Attorney, Agent, or Firm—Robert E. Bushnell

[57] ABSTRACT

A motion adaptive frequency folding method and circuits thereof for folding high-frequency components over low-frequency components of a brightness signal for enabling recording of a video signal having a full bandwidth onto a recording medium having a restricted bandwidth in order to improve resolution of a video image by preventing deterioration of the video image due to artifacts and noise. The motion adaptive frequency folding method comprises the steps of detecting high-frequency components above a reference frequency band and low-frequency components below the reference frequency band of the brightness signal, detecting a motion coefficient indicative of motion of an image from the brightness signal, controlling a magnitude of the high-frequency components and limiting transmission of the high-frequency components of the brightness signal in dependence upon said motion coefficient, and folding the high-frequency components above said reference frequency band having relative magnitudes controlled and limited by said motion coefficient over the low-frequency components below the reference frequency band of the brightness signal to produce a folded brightness signal.

6 Claims, 2 Drawing Sheets

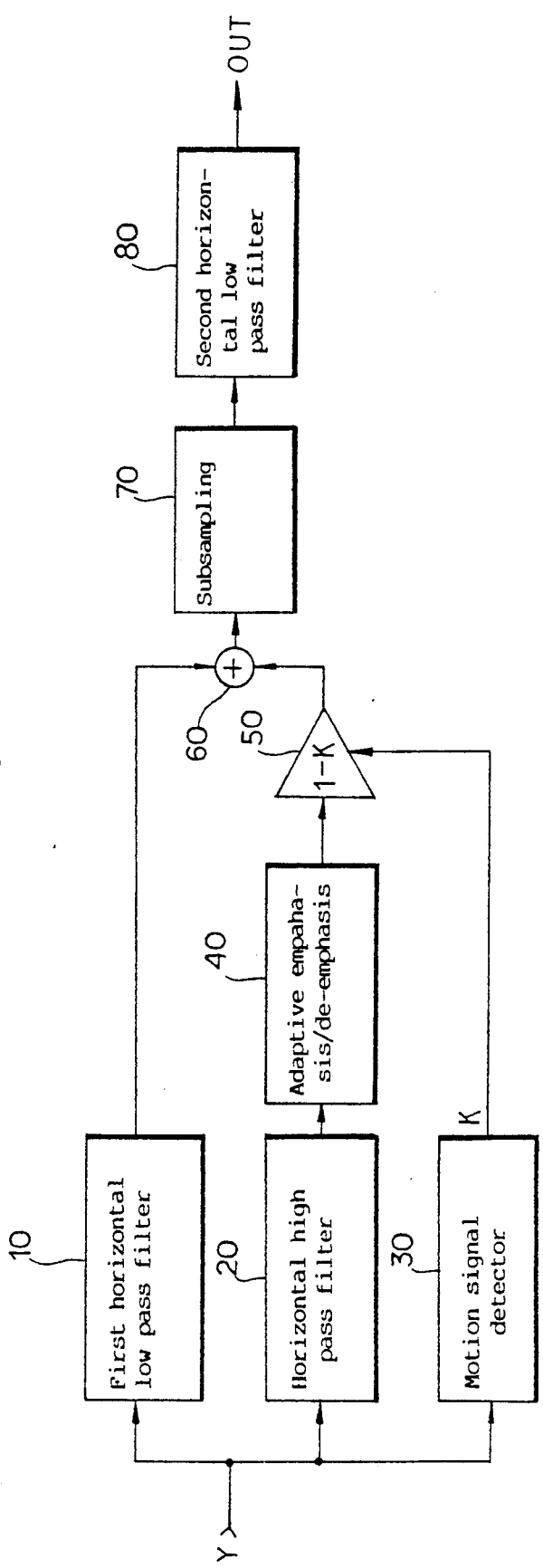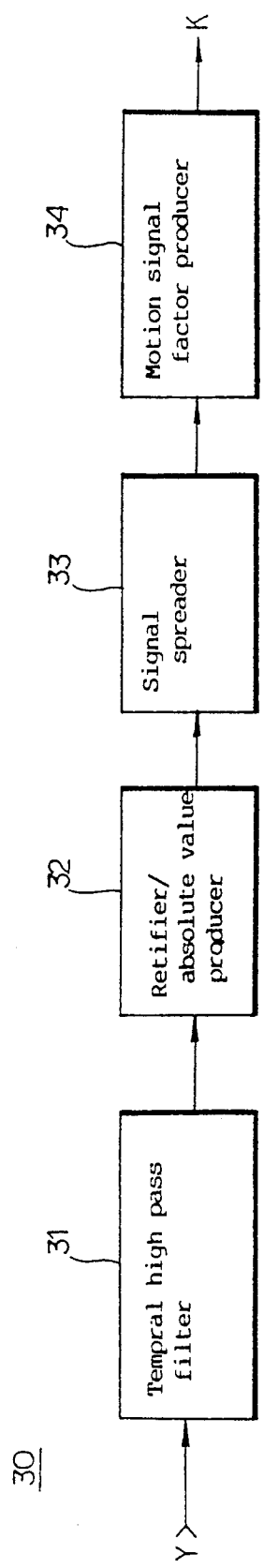

MOTION ADAPTIVE FREQUENCY FOLDING METHOD AND CIRCUIT

BACKGROUND OF THE INVENTION

1. Field of the Invention

The present invention relates to a motion adaptive frequency folding method and circuit suitable to a system having a restricted frequency band, such as a television, video tape recorder, laser disc player or the like for folding a signal component having a predetermined frequency over a signal component below the frequency.

2. Description of the Prior Art

In general, it is well-known that a conventional VHS video tape recorder is incapable of recording a signal having a high frequency above 2.5 MHz from the view point due to the limited characteristics of the magnetic video tape which contributes to a deterioration of a picture image upon reproduction by the video tape recorder because only 60% of a television signal band is utilized in the system.

Meanwhile, a super-VHS video tape recorder can send a signal beyond a television signal band so as to provide an excellent picture image, but it is not compatible with the existing VHS video tape recorder. That is, when a signal recorded by a standard VHS video tape recorder is reproduced by means of the super-VHS video tape recorder system, the resolution of the reproduced signal is deteriorated considerably. Further, the super-VHS video tape recorder requires a magnetic tape of a high standard as well as a recording/replaying apparatus of superior quality.

To address this deficiency, a video signal recording/replaying apparatus which can record a video signal having a bandwidth wider than that of a video signal to be recorded by the standard VHS video cassette recorder onto the standard magnetic tape and is compatible with the standard-VHS video cassette recorder has been proposed in, for example, U.S. Pat. No. 5,113,202.

With the patent, a motion signal indicating a movement of the video image to be reproduced is appropriately extracted and then the extracted motion signal is modified and recorded into a color signal.

The motion signal is used to control a transmission of a full band-width signal arears to be unfolded in an original frequency band during reproduction by the system, wherein a high frequency component of a brightness signal is folded over a low frequency component thereof.

According to the construction, however, when the motion signal is not correctly detected upon reproduction of a picture image, the picture image is deteriorated in quality because of artifacts such as dot crawl patterns or the likes occurred owing to frequency interleaving between the to motion signal and a folding carrier.

SUMMARY OF THE INVENTION

Accordingly, an object of the present invention is to provide a motion adaptive frequency folding method and circuit for differently folding a signal having a restricted frequency band by using a motion signal indicating a motion video image and recording the signal of full bandwidth so as to prevent deterioration of the quality of the video image due to artifacts upon reproduction the motion. That is, the object of the present invention is to provide a method of folding the signal component above a predetermined frequency over the signal component below the frequency in order to record a video signal of full bandwidth on the recording medium having a restricted bandwidth.

To achieve the above object, a motion adaptive frequency folding method comprising the steps of: separately filtering high frequency and low frequency brightness signals, each having a bandwidth above and below the bandwidth of a recording medium, from a brightness signal with a full bandwidth; detecting a motion signal from the brightness signal with a full bandwidth; controlling gain of the high-frequency brightness signal; limiting an output level of the high-frequency brightness signal controlled in the the motion signal; detecting step and folding the high-frequency brightness signal at the time of detection of a still image over the low-frequency brightness signal.

Also, the present invention provides a motion adaptive frequency folding circuit comprising: a first horizontal low pass filter means for filtering a low-frequency brightness signal having a bandwidth below a recording medium bandwidth from a brightness signal having a full bandwidth; horizontal high pass filter means for separating a high-frequency brightness signal having a bandwidth above the recording medium bandwidth from the brightness signal; a motion signal detector means for producing a factor corresponding to a motion signal from the brightness signal; a gain controller means for controlling gain of the high-frequency signal output from the horizontal high pass filter; a signal limiter for limiting of the high-frequency brightness signal output from the gain controller in dependence upon the motion signal factor produced by the motion signal detector; an adder for adding the high-frequency brightness signal limited by the signal limiter and the low-frequency brightness signal output from the first horizontal filter; a subsampling device for folding the high-frequency brightness signal above a bandwidth of a transfer medium of the brightness signal outputted from the adder over the low-frequency brightness signal of the brightness signal; and, a second horizontal low pass filter for passing only the signal component below the bandwidth of the recording medium in the folded brightness signal.

The above and other objects, features and advantages will be apparent from the following description taken with reference to the accompanying drawings.

BRIEF DESCRIPTION OF THE DRAWINGS

FIG. 1 is a block diagram showing a motion adaptive frequency folding circuit according to a preferred embodiment of the present invention;

FIG. 2 is a detailed block diagram of a motion signal detector in FIG. 1;

DETAILED DESCRIPTION OF THE PREFERRED EMBODIMENT

Figure 3:
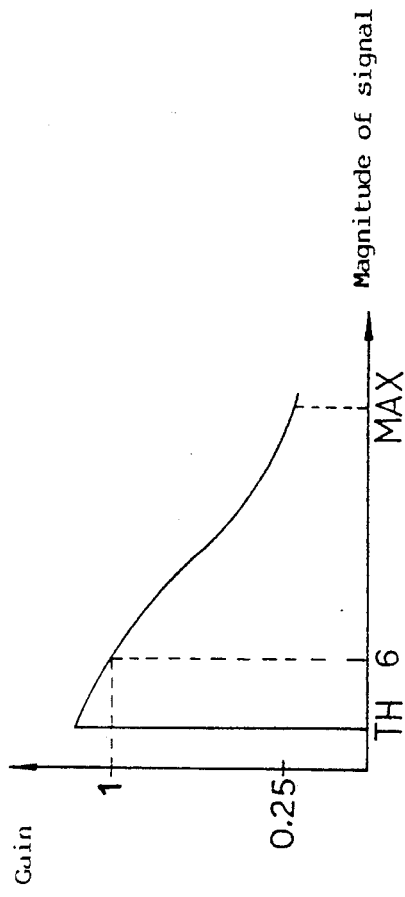
FIG. 3 is a graph showing gain of an adaptive emphasis/de-emphasis in FIG. 1; and, FIG. 4 is a view showing a field offset subsample pattern of the motion adaptive frequency folding circuit in FIG. 1.

Thereinafter, a preferred embodiment of the present invention will be described with reference to the drawings.

Referring to FIG. 1, there is shown a block diagram of a motion adaptive frequency folding circuit according to the preferred embodiment of the present invention. In the drawing, a first horizontal low pass filter 10 receives a brightness signal Y and passes a signal component below a predetermined cutoff frequency, for example, 2.5 to 3 MHz. A horizontal high pass filter 20 also receives the brightness signal Y and passes a signal component above the cutoff frequency.

A motion signal detector 30, detects a motion signal from the brightness signal Y and produces a motion factor K corresponding to the motion signal. Further, an adaptive emphasis/de-emphasis portion 40 which is referred as a gain controller, serves to increase or decrease of the signal level from the horizontal high pass filter 20. A signal limiting portion 50 limits the signal supplied from the adaptive emphasis/de-emphasis portion 40 on the basis of the motion factor K produced by the motion signal detector 30. An adder 60 adds the low-frequency brightness component signal outputted from the horizontal low pass filter 10 and the high-frequency brightness component signal from the signal limiting portion 50. The added signal is input to a sub-sampling portion 70 which executes a field offset sub-sampling so as to fold the signal component above a predetermined reference frequency band over the signal component below the reference frequency band of the adder signal.

In the drawing, 80 denotes a second horizontal low pass filter which extracts the signal below the reference frequency in the folded signal from the subsampling portion 70.

FIG. 2 shows a detailed block diagram of the motion signal detector in FIG. 1. As shown in FIG. 2, the motion signal detector 30 comprises a temporal high pass filter 31 for detecting the motion signal from the brightness signal, a rectifier/absolute value producer portion 32 for rectifying the motion signal from the temporal high pass filter 31 and obtaining an absolute value of the rectified signal, a signal spreader 33 for spreading the absolute-valued motion signal in horizontal, vertical and time, and softening an abrupt change of the motion signal, and a motion signal factor producer 34 for producing a motion factor K corresponding to the motion signal output from the signal spreader 33.

Figure 4:
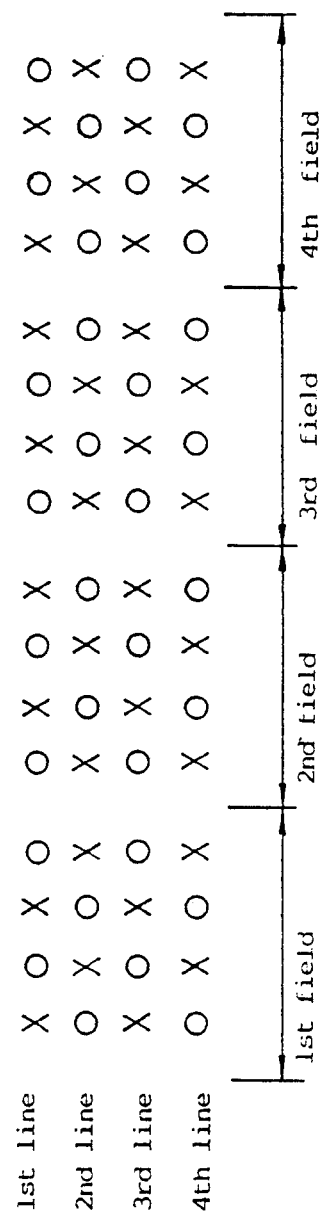

Now, the construction of the present invention will be described in detail with reference to FIGS. 3 and 4, in which FIG. 3 shows a gain characteristic view of the adaptive emphasis/de-emphasis and FIG. 4 shows a field offset subsample.

In accordance with the conventional VHS video tape recorder as previously described, a signal having a high frequency above 2.5 to 5.0 MHz or 3.0 to 5.0 MHz cannot be recorded on the recording medium on the view point of the property of the medium. For this reason, a cut-off frequency is preferably set to be 2.5 to 3.0 MHz.

When the cut-off frequency is set to be 2.5 MHz, the first horizontal low pass filter 10 extracts the brightness component having a frequency below 2.5 MHz, while the horizontal high pass filter 20 extracts the brightness signal component having a frequency above 2.5 MHz. Further, the motion signal detector 30 detects the motion signal from the brightness signal Y so as to produce the motion factor K corresponding to the motion signal.

Consequently, in the motion signal detector 30 shown in FIG. 2, the temporal high pass filter 31 detects the motion signal of the brightness signal Y and the rectifier/absolute value producer portion 32 rectifies the motion signal applied from the temporal high pass filter 31 and produces the absolute value of the rectified motion signal.

The motion signal thus substituted by the absolute value is spreaded by means of the signal spreader 33 in horizontal, vertical and time. Upon spreading the motion signal, artifacts such as blurring to be occurred in switching an abruptly changed portion of the motion signal by the signal limiting portion 50 shown in FIG. 1 can be effectively prevented. More particularly, the picture may be deteriorated at an edge due to the transition from a still video image to a motion video image. In this connection, the spreading is executed to extend the range of the motion signal so as to gradually change the motion signal. Next, the motion signal factor producer 34 produces the motion signal factor K on the basis of the output value of the signal spreader 33 and inputs the motion factor K to the signal limiting portion 50 shown in FIG. 1 so that the high-frequency signal component to be folded is limited effectively.

Meanwhile, the brightness signal with a frequency above 2.5 MHz passed through the horizontal high pass filter 20 is provided to the adaptive emphasis/de-emphasis portion 40 having a gain characteristic as shown in FIG. 3. Accordingly, the brightness signal is limited in level by the adaptive emphasis/de-emphasis portion 40. For example, assuming that the gain characteristic of the emphasis/de-emphasis portion 40 is set to be 6*A (where, A is an absolute value of the horizontal high pass filter 20, when the output value of the horizontal high pass filter 20 is set to be 4, the output value of the adaptive emphasis/de-emphasis portion 40 becomes $\sqrt{4}$. As a result, the adaptive emphasis/de-emphasis portion 40 produces the output value larger than that of the horizontal high pass filter 20.

Alternatively, when the output value of the horizontal high pass filter 20 is set to be $-9$ or $+9$, the output level of the adaptive emphasis/de-emphasis portion 40 becomes $\sqrt{-54}$ or $°+54$ lower than the input value of the horizontal high pass filter 20. Accordingly, as the output value of the horizontal high pass filter 20 is increased, the output value of the adaptive emphasis/de-emphasis portion 40 is decreased to ⅓ from the original value depending upon the gain characteristic shown in FIG. 3. Hence, it should be noticed that when the output value of the adaptive emphasis/de-emphasis portion 40 is decreased to ⅓, even if the folded component is unpleasantly displayed on a screen when the signal recorded on the magnetic video tape by means of the video tape recorder employed with the present invention is replayed by the existing video tape recorder, a magnitude of the high frequency signal component is controlled to thereby prevent a folding of the signal. As a result, it improves the compatibility between the recorders.

Moreover, when the gain characteristic of the adaptive emphasis/de-emphasis portion 40 is set to be 1 or more, if a minute signal in level is recorded onto or reproduced from the recording medium such as the video tape, it is possible to prevent the signal from being deteriorated and to improve a signal resolution even if noise is induced thereto upon reproduction of the signal.

The output signal of the adaptive emphasis/de-emphasis portion 40 thus controlled in gain is transferred to the signal limiting portion 50 which limits the output signal on the basis of the motion factor K output from the motion signal detector 30. More particularly, when the brightness signal Y is detected as a signal of a still picture image, the motion factor K of the motion signal detector 30 is set to be "zero". In this case, the signal limiting portion 50 passes the output value of the adaptive emphasis/de-emphasis portion 40 toward the adder 60. Alternatively, when the input composite video signal is detected as a signal of a semi-motion picture image, the motion factor K of the motion detector 30 is set to be 0.125, for example. Therefore, the output, 1-K of the signal limiting portion 50 is set to 0.875 in rate so that the 0.875 in rate of the output value of the adaptive emphasis/de-emphasis 40 is folded by passing through the signal limiting portion 50.

When the brightness signal Y indicates the motion picture image, the motion factor K of the motion signal detector 30 becomes 1 and, hence, the signal limiting portion 50 cuts off the output value of the adaptive emphasis/de-emphasis 40. In other words, when the motion factor K from the motion signal detector 30 is set under a predeterminded reference level, the signal limiting portion 50 outputs the high-frequency brightness signal controlled in gain by the adaptive emphasis/de-emphasis portion 40. That is, when a magnitude of the motion factor K is under a predetermined level which indicates a still picture image signal, the signal limiting portion 50 outputs the gain-controlled high frequency brightness component. Further, the reference level can be arbitrarly set to determine the still picture image.

Accordingly, when the still picture image is determined, the adder 60 adds the high-frequency component passed through the signal limiting portion 50 and the low-frequency component passed through the first horizontal low pass filter 10. Alternatively, when the motion picture is determined, the adder 60 outputs only the low-frequency component passed through the first horizontal low pass filter 10. Further, when the semimotion picture is determined, the adder 60 adds the high-passed signal component according to the presently set value of the motion factor K and the output signal of the first horizontal low pass filter 10. Consequently, the subsampling portion 70 performs a field offset subsampling with respect to output signal of the adder 60 to fold the high-frequency signal component over the low-frequency component. The folded signal is then entered to the second horizontal low pass filter 80 which cuts off the signal having a frequency above 2.5 MHz. Thereafter, the output signal of the second horizontal low pass filter 80 is supplied to an output terminal OUT through which the signal is recorded on a predetermined recording medium.

As described above, even if the folded signal component above 2.5 MHz in frequency, it has no effect on the video image to be reproduced. Furthermore, under consideration of the compatibility with the existing VHS video tape recorder, limitation of the signal band is carried out to prevent the deterioration of the picture due to the folded signal contained in the component above 2.5 MHz.

Additionally, a detailed description will be made with relation to the frequency filding performed by the subsampling portion 70.

Firstly, the composite video signal having a bandwidth of 5.0 MHz is sampled with sampling rate of 10 MHz satisfying a Nyquist theory by an analog to digital (A/D) converter (not shown). The sampled composite video signal is passed through a brightness/color signal separating circuit (not shown) and the low-frequency component of the video signal is passed through the first low pass filter 10 while high-frequency component is passed through the horizontal high pass filter 20, adaptive emphasis/de-emphasis portion 40 and signal limiting portion 50. The low and high frequency components are added by the added 60 and then entered to the subsampling portion 70. Accordingly, the subsampling portion 70 subsamples the video signal having a frequency of 5.0 MHz to fold the high frequency component above 2.5 MHz over the low frequency component under 2.5 MHz on the basis of a reference frequency of 2.5 MHz. In the sampling method performed by the subsampling portion 70, the signal sampled with the sampling frequency of 10 MHz is further sampled on alternative samples in a horizontal direction. More particularly, the samples on the first line are alternatively sampled and the sampling between the lines is executed in a manner opposed to the upper line, as shown in FIG. 4. In addition, each of the first to fourth fields, for example, is sampled in a manner shown in FIG. 4 so that the high frequency is folded over the low frequency band as described above, and a spectrum of the folded signal is positioned in the vicinity of a Funkinuki hole. The folded signal from the subsampling portion 70 is entered to the horizontal low pass filter 80 which cuts off the signal above 2.5 MHz, and then output outwardly.

As described above, according to the motion adaptive frequency folding method and circuit, the high-frequency component of the brightness signal is increased or decreased on the basis of the gain to be controlled according to the magnitude thereof and is folded depending upon an amount of the motion signal so that the brightness signal is recorded in full band on the recording medium having a restricted bandwidth, whereby the video signal is successfully reproduced in good quality.

What is claimed is:

1. A motion adaptive frequency folding method, comprising the steps of:

separately filtering high frequency and low frequency brightness signal, each having a bandwidth above and below the bandwidth of a recording medium, from a brightness signal having a full bandwidth;

detecting a motion signal from the brightness signal having said full bandwidth;

controlling gain of the high-frequency brightness signal;

limiting an output level of the high-frequency brightness signal in dependence upon the motion signal; and folding the high-frequency brightness signal at the time of detection of a still image over the lower-frequency signal.

2. The motion adaptive frequency folding method according to claim 1, wherein the step of controlling the gain is executed so that the gain of the high-frequency brightness signal under a predetermined frequency is increased and the gain of the high frequency brightness signal above said predetermined frequency is decreased.

3. The motion adaptive frequency folding method according to claim 1, wherein the step of limiting the signal is executed so that when the motion signal has a magnitude above a value indicative of a motion picture, the high frequency brightness signal is cut off.

4. A motion adaptive frequency folding circuit, comprising:

first horizontal low pass filter means for detecting a low-frequency component brightness signal having a bandwidth below a bandwidth of a recording medium from a brightness signal having a full bandwidth;

horizontal high pass filter means for detecting a high-frequency component brightness signal having a bandwidth above the bandwidth of the recording medium from the brightness signal;

motion signal detector means for producing a motion factor corresponding to a motion signal from the brightness signal, said motion signal being indicative of motion of an image;

gain control means for controlling gain of the high-frequency component brightness signal;

signal limiting means for limiting of the high-frequency component brightness signal output from the gain control means in dependence upon the motion factor;

adding means for adding the high-frequency component brightness signal limited by the signal limiting means and the low-frequency component brightness signal output from the first horizontal low pass filter means;

subsampling means for folding the high-frequency component brightness signal above a bandwidth of a transfer medium of the brightness signal output from the adding means over the low-frequency component brightness signal of the brightness signal to produce a folded brightness signal; and second horizontal low pass filter means for passing only the folded brightness signal having a bandwidth below the bandwidth of the recording medium.

5. The motion adaptive frequency folding circuit according to claim 4, wherein the gain control means increases the gain of the high frequency component brightness signal under a reference level from the high pass filter means, and decreases the gain of the high frequency brightness signal above the reference level.

6. The motion adaptive frequency folding circuit according to claim 4, wherein the signal limiting means outputs the gain-controlled high frequency component brightness signal when the magnitude of the motion factor is under a reference level for determining a still motion image.

* * * * *

UNITED STATES PATENT AND TRADEMARK OFFICE
CERTIFICATE OF CORRECTION

PATENT NO.   :   5,303,059                              page 1 of 2
DATED        :   April 12, 1994
INVENTOR(S)  :   Young-Je Kim It is certified that error appears in the above-indentified patent and that said Letters Patent is hereby corrected as shown below:

| | | |
|---|---|---|
| Column 1, | Line 17, | Delete "from the view"; |
| | Line 18, | Delete "point"; |
| | Line 46, | Delete "arears"; |
| | Line 55, | Preceding "frequency interleaving", Insert --the--; |
| | Line 56, | delete "to" |
| | Line 66, | Delete "the motion"; |
| Column 2, | Line 14, | After "signal", Delete ";", After "step", Insert --;-- ; |
| | Line 26, | Preceding "for producing", Delete "means"; |
| | Line 28, | Preceding "for controlling", Delete "means"; |
| | Line 40, | Change "outputted" to --output--; |
| | Line 41, | After "and", Delete "," ; |

UNITED STATES PATENT AND TRADEMARK OFFICE
CERTIFICATE OF CORRECTION

PATENT NO. : 5,303,059
DATED : April 12, 1994
INVENTOR(S) : Young-Je Kim

It is certified that error appears in the above-indentified patent and that said Letters Patent is hereby corrected as shown below:

Column 3,    Line 7,     After "30", Delete ",";

Line 17,    Change "outputted" to --output--;

Line 25,    Change "adder" to --added--;

Line 52,    Delete "view point of";

Column 4,    Line 15,    Preceding "motion", Delete "signal";

Line 32,    Change "$\sqrt{4}$" to --$\sqrt{24}$--;

Line 38,    Change "°+54" to --$\sqrt{1+54}$--;

Column 6,    Line 5,     Change "added" to --adder--.

Signed and Sealed this

Eighteenth Day of October, 1994

Attest:

BRUCE LEHMAN

*Attesting Officer*     *Commissioner of Patents and Trademarks*